United States Patent [19]

Duncan

[11] Patent Number: 4,556,776
[45] Date of Patent: Dec. 3, 1985

[54] WELDING FIXTURE FOR NUCLEAR REACTOR FUEL ASSEMBLY GRID

[75] Inventor: Robert Duncan, Fork Township, S.C.

[73] Assignee: Westinghouse Electric Corp., Pittsburgh, Pa.

[21] Appl. No.: 517,496

[22] Filed: Jul. 26, 1983

[51] Int. Cl.$^4$ .................... B23K 27/00; B25B 1/20
[52] U.S. Cl. .................... 219/121 LC; 269/37; 269/41
[58] Field of Search .............. 219/121 LC, 121 LD, 219/121 EC, 121 ED, 121 LY, 121 EX; 228/44.1 R, 49 C, 182, 183; 269/37, 41, 43; 376/438, 441, 442, 462

[56] References Cited

U.S. PATENT DOCUMENTS

| | | | |
|---|---|---|---|
| 3,836,135 | 9/1974 | Wightman | 269/43 |
| 4,027,868 | 6/1977 | Jolly | 269/303 X |
| 4,132,396 | 1/1979 | Graham | 269/41 |
| 4,286,778 | 9/1981 | Follmeyer | 269/303 X |
| 4,291,218 | 9/1981 | Myhre | 269/37 X |

*Primary Examiner*—C. L. Albritton
*Attorney, Agent, or Firm*—D. E. Erickson

[57] ABSTRACT

A welding fixture for a nuclear fuel assembly grid having rigid top and bottom members and having apparatus for releasably securing them together. The bottom and top members each have an egg-crate configuration of interleaved fixture straps. Top notches on the bottom fixture straps' top edges are placed to engage the grid straps' bottom edges when the grid straps are aligned for welding. Likewise, bottom notches on the top fixture straps' bottom edges are placed to engage the grid straps' top edges when the grid straps are aligned for welding.

8 Claims, 8 Drawing Figures

WELDING FIXTURE FOR NUCLEAR REACTOR FUEL ASSEMBLY GRID

BACKGROUND OF THE INVENTION

The present invention relates generally to welding fixtures and more particularly to a fixture for positioning grid straps in an egg-crate array during their welding together into a nuclear fuel rod spacer grid.

Nuclear fuel assemblies include a matrix of nuclear fuel rods which are arrayed in rows and columns and which are held in the desired configuration by a plurality of fuel rod grids. These grids are produced from "straps" which are linearly extending, generally rectangular elements, characterized by having slots extending from one edge approximately halfway through the depth of the strap. The grid straps are assembled so that one strap is in mating relationship with the other strap. Thus, the slot of one strap engages the other strap at a portion thereof which is in alignment with the slot of that other strap, with the result that the grid is of the same depth as each of the straps which forms the grid. The resulting grid has a first set of straps which are substantially parallel to each other, and equally spaced, and a second set of straps which are parallel to each other and equally spaced, the straps of one set being perpendicular to the straps of the other set. All of the aforesaid straps are designated as "inner grid straps", and they are placed in mating relationship to form a square grid of square cells, in the above noted rows and columns. In addition, there are provided outer grid straps, which are placed on the four sides of the grid.

The assembled grid straps are held in a fixture and welded together. The welding fixture must insure the parallel and equal spacing of the grid straps of each set of grid straps, the perpendicularity of the grid straps of each set relative to the grid straps of the other set, and that the edges of the grid straps are straight. Further, the use of welding beam techniques requires not only the holding of the grid straps as hereinabove described, but also requires that the laser beam have access to each of the locations to be welded, particularly to the points of intersection of the grid straps.

An existing grid welding fixture used with laser beam welding, which has been in use for more than one year by the inventor's assignee (see U.S. patent application No. 414,265 entitled Welding Plates For A Fuel Rod Grid, by Richard M. Kobuck et al., which was filed 9/1/82), uses clamping bolts to releasably secure a top welding plate to a bottom welding plate. The welding plates are thick for required rigidity. Each welding plate is expensively machined to provide alignment grooves for the grid strap edges and to provide access holes for the laser welding of the grid straps at their intersection points. What is needed is a lighter and less expensive grid welding fixture.

SUMMARY OF THE INVENTION

Briefly stated, the invention is directed towards a welding fixture for a nuclear fuel assembly grid. The fixture has rigid top and bottom members and has apparatus for releasably secured them together. The bottom and top members each have an egg-crate configuration of interleaved fixture straps. Top notches on the bottom fixture straps' top edges are placed to engage the grid straps' bottom edges when the grid straps are aligned for welding. Likewise, bottom notches on the top fixture straps' bottom edges are placed to engage the grid straps' top edges when the grid straps are aligned for welding.

In a preferred embodiment of the invention, the securing apparatus includes the bottom member having upward extending links whose lower ends are integral with and end of an associated bottom fixture strap, and likewise the top member having similar but downward extending links. The securing apparatus also includes a device for releasably connecting the free ends of the links to the opposing top or bottom member, as appropriate, when the grid straps are engaged in the notches. Preferably, the connecting apparatus includes pins extending through aligned holes in the upward and downward extending links.

BRIEF DESCRIPTION OF THE DRAWINGS

The subject matter of the invention is particularly pointed out and distinctly claimed in the concluding portion of this specification. The invention, however, both as to organization and method of operation, together with further advantages thereof, may best be understood by reference to the following description taken in connection with the accompanying drawings in which:

DETAILED DESCRIPTION OF THE INVENTION

Figure 1:
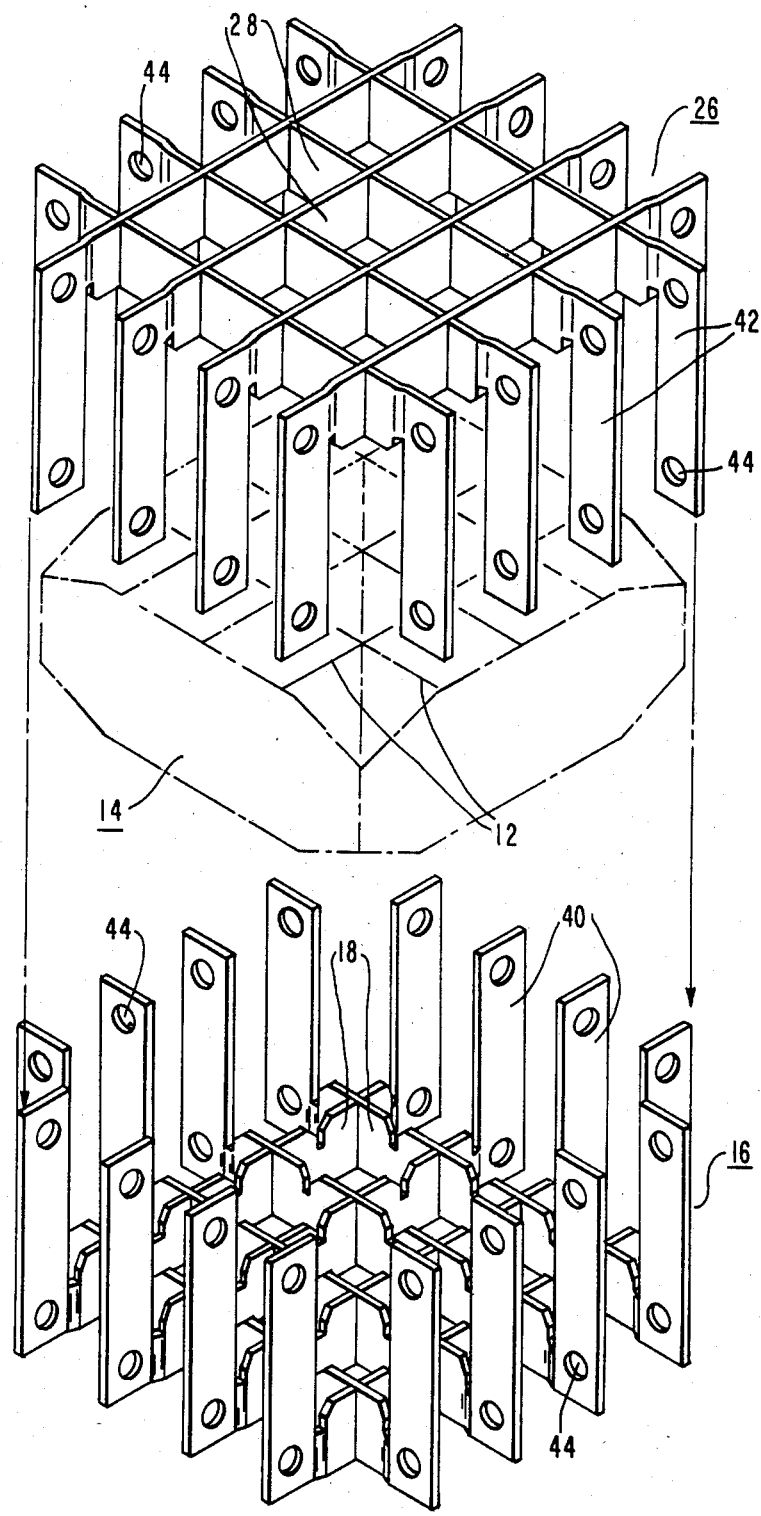
FIG. 1 is a perspective view of the just-separated top and bottom members of the welding fixture of the invention including a just-welded grid removed therefrom.
Figure 2:
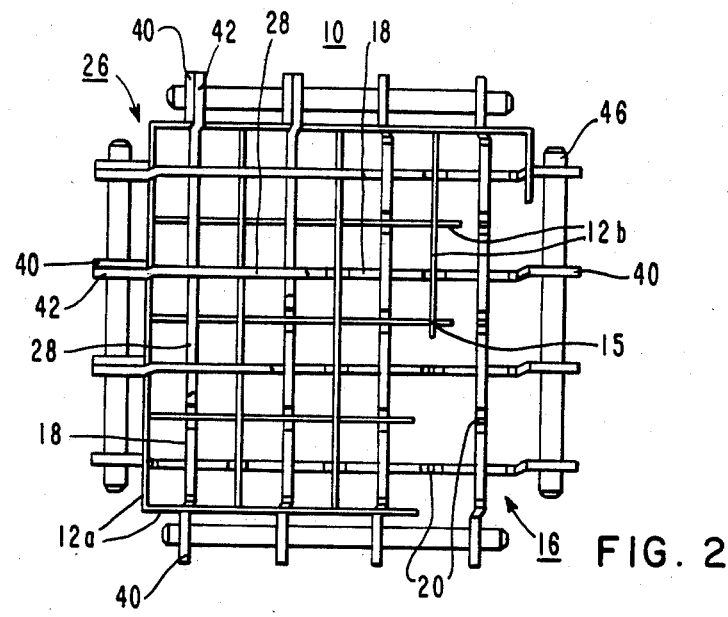
FIG. 2 is a planar, partially cutaway view of the assembled welding fixture (including the pins for releasably securing the top and bottom members together) holding the enclosed grid straps in position for welding.

Reference will now be made in detail to several present preferred embodiments of the invention, an example of which is illustrated in the accompanying drawings. In the drawings, like reference characters designate like or corresponding parts.

Figure 7:
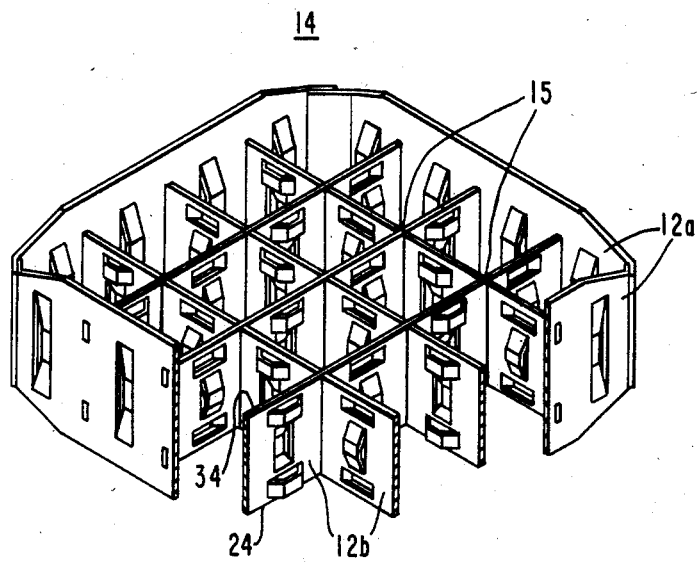
FIG. 7 is a perspective, partially cutaway view of a welded grid.

A nuclear reactor fuel assembly grid 14 (see FIGS. 1 and 7) is manufactured by the welding together of grid straps 12. The grid 14 generally is of an approximately square configuration with the grid straps 12 fixedly disposed in an egg-crate array. Four outer grid straps 12a form the periphery of the grid 14 while inner grid straps 12b with mating slots are interleaved providing points of intersection 15. The outer grid straps 12a are generally wider and thicker than the inner grid straps 12b. Each end of an outer grid strap 12a is welded by a corner seam weld to the end of a perpendicularly disposed outer grid strap. The inner grid straps 12b are welded together at their points of intersection 15. The inner grid straps 12b have tabs at each end which mate with slits in the outer grid straps 12a. Tab and slit welds join together the outer grid straps 12a and the inner grid straps 12b. A computer-controlled precision laser welding apparatus (not shown) controls the welding beam and the positioning of the welding platform. The grid welding fixture 10 of the invention, which would be mounted on the welding platform, properly positions the grid straps 12 in the desired egg-crate array for their welding together into a grid 14.

As seen in the Figures, the grid welding fixture 10 has a rigid bottom member 16, a rigid top member 26, and means for releasably securing the bottom member 16 and the top member 26 rigidly together.

Figure 3:
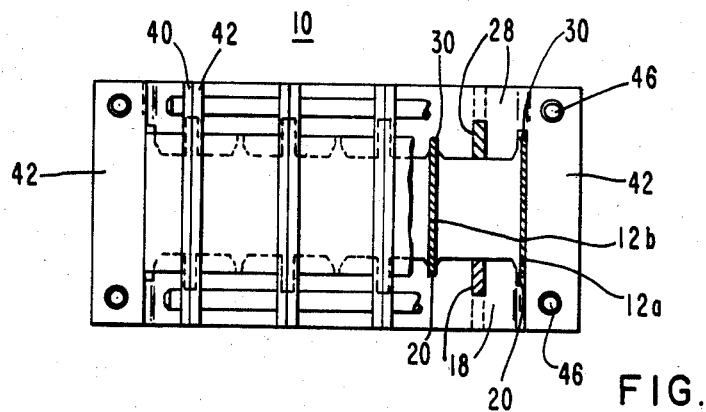
FIG. 3 is a front elevational, partially cutaway view of the welding fixture and the to-be-welded grid straps of FIG. 2.

The bottom member 16 has a number of interleaved bottom fixture straps 18 (see FIGS. 3, 4A and 4B) which are fixedly arranged in an egg-crate configuration (see FIG. 1). A first set of elongated, spaced-apart, parallel bottom fixture straps has each of its straps 18a (see FIG. 4B) with interleavable top slits 48. A second set of elongated, spaced-apart, parallel bottom fixture straps has each of its straps 18b (see FIG. 4A) with interleavable bottom slits 50. The second set of straps 18b is rotated 90° and lowered to perpendicularly interweave with the first set of straps 18a by the engagement of the top slits 48 with the bottom slits 50. These bottom fixture straps 18a and 18b are secured together by welding. The top edges 22 of the bottom fixture straps 18 have top alignment notches 20 which are located to engage the bottom edges 24 of the grid straps 12 when the latter are in proper alignment for welding together into a grid 14.

Figure 5:
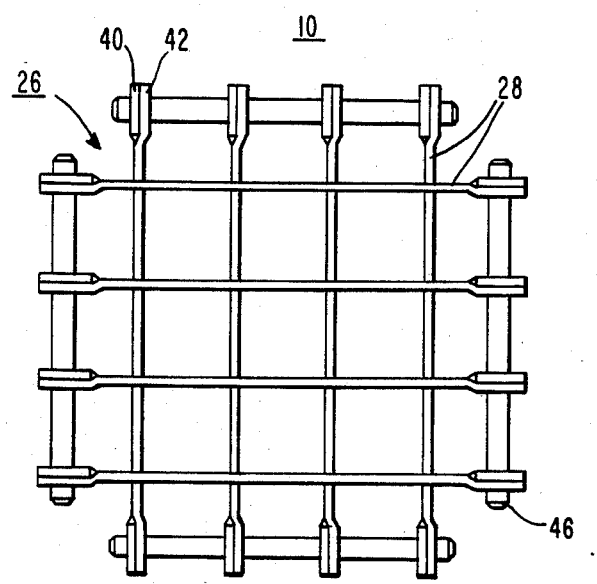
FIG. 5 is a planar view of the assembled welding fixture with the grid straps omitted for clarity.
Figure 6:
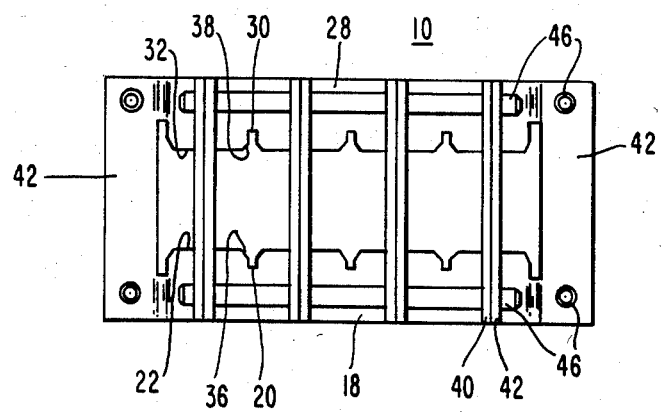
FIG. 6 is a front elevational view of the welding fixture of FIG. 4.

Likewise, the top member 26 has a number of interleaved top fixture straps 28 (see FIGS. 3 and 5), which are fixedly arranged in an egg-crate configuration (see FIGS. 1 and 3) in a manner similar to that previously discussed for the bottom fixture straps 18. The bottom edges 32 of the top fixture straps 28 have bottom alignment notches 30 which are located to engage the top edges 34 of the grid straps 12 when the latter are in proper alignment for welding together into a grid 14. For most applications, a top fixture strap assemblage is identical to a bottom fixture strap assemblage which has been turned upside down.

Figure 4A:
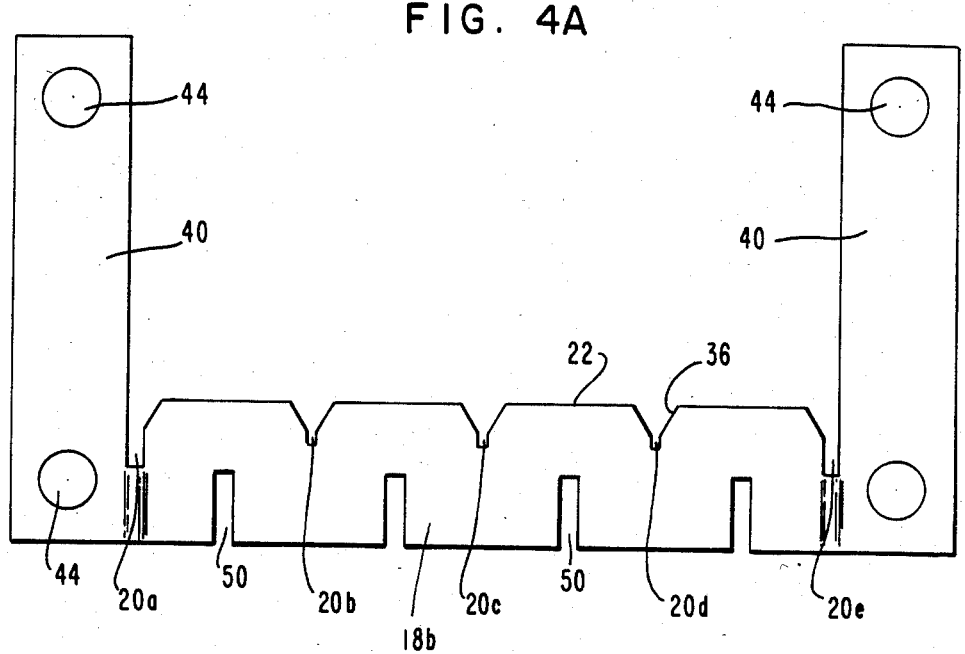
FIGS. 4A and 4B are enlarged, front elevational views of the two types of individual bottom fixture straps (with upwardly extending links integral with their ends) which are fixedly interleaved to make the rigid bottom member.
Figure 4B:
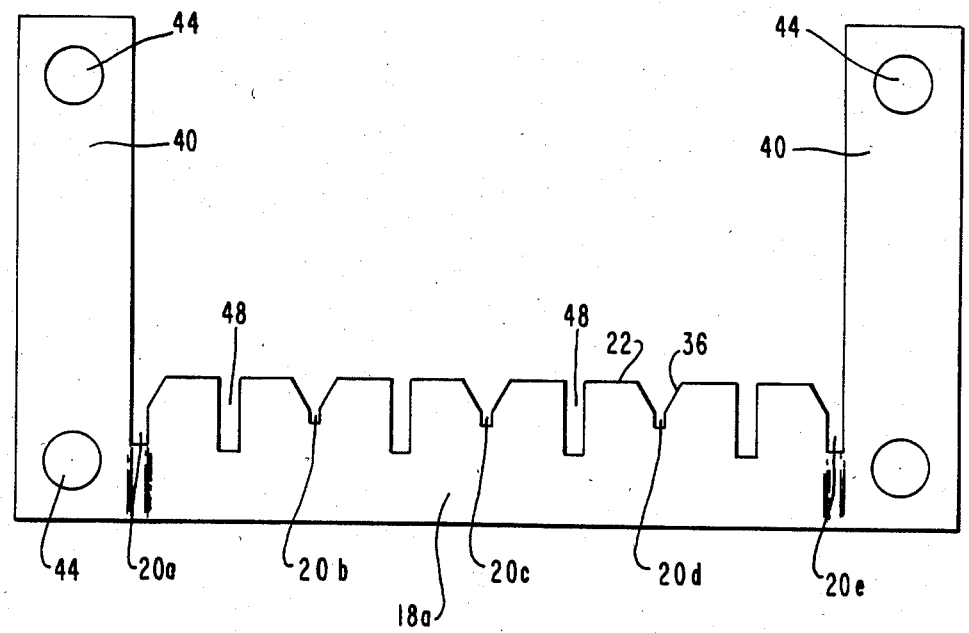

Preferably, the top notches 20 are located such that a line segment connecting any two adjacent top notches (e.g. 20a and 20b, 20b and 20c, etc. in FIG. 4B) on any one bottom fixture strap (e.g. 18a) is generally perpendicularly bisected by a corresponding interleaved other bottom fixture strap (e.g. 18b in FIG. 4A). Likewise, the bottom notches 30 preferably are located such that a line segment connecting any two adjacent bottom notches 30 on any one top fixture strap 28 is generally perpendicularly bisected by a corresponding interleaved other top fixture strap. This will generally position the top and bottom weldable points of intersection 15 of any two interleaved grid straps in the middle of a top and a bottom square cell array of surrounding fixture straps which provides such points of intersection 15 with ready access for beam welding.

It is desirable that each top notch 20 has at least one side with a lead-in chamfered upper portion 36 and each bottom notch 30 has at least one side with a lead-in chamfered lower portion 38 to help guide in the edges 32 and 22 of the grid straps 12. To accommodate the larger outer grid straps 12a with respect to the smaller inner grid straps 12b, the outermost top notches (e.g. 20a and 20e in FIG. 4B) on each bottom fixture strap 18 are deeper and wider than the other top notches (e.g. 20b, 20c, and 20d in FIG. 4B) on that bottom fixture strap 18. Likewise, the outermost bottom notches 30 on each top fixture strap 28 are deeper and wider than the other bottom notches 30 on that top fixture strap 28.

The previously mentioned securing means releasably secures the bottom member 16 and the top member 26 rigidly together when the grid straps 12 are engaged in the top 20 and bottom 30 notches. Preferably, the securing means includes the bottom member 16 also having a number of vertically upward extending links 40, the top member 26 also having a number of vertically downward extending links 42, and means for releasably connecting each upward extending link's upper end to the top member 26 and each downward extending link's lower end to the bottom member 16 when the grid straps 12 are engaged in the top 20 and bottom 30 notches. The lower end of each upward extending link 40 is integral with one end of an associated bottom fixture strap 18 and the upper end of each downward extending link 42 is integral with one end of an associated top fixture strap 28. It is desirable that the ends of each bottom fixture strap 18 have integral upward extending links 40 and the ends of each top fixture strap 28 have integral downward extending links 42.

It is preferred that the upward extending links 40 define one side of the outermost top notches 20 of the bottom fixture straps 18 (see FIGS. 4A and 4B), and likewise the downward extending links 42 define one side of the outermost bottom notches 30 of the top fixture straps 28.

It is recommended that the connecting means include the links 40 and 42 being positioned to define the sides of a cage-like square array surrounding the grid straps 12 when the grid straps 12 are engaged in the notches 20 and 30. The links 40 and 42 associated with each side of the square array have at least one set (and preferably two) of aligned holes 44. For each side of the square array, a pin 46 slidably engages a corresponding set of aligned holes 44. Other connecting means include standard mechanical fastening techniques, known to those skilled in the art, such as bolts, clamps, or hook and latch mechanisms on several pairs of adjacent upward extending and downward extending links, and the like.

Other securing means includes "C"-type clamps on peripheral flanges of the top and bottom member fixture straps (without any links), bolts secured against mounting plates of the top and bottom member fixture straps, and any standard mechanical, releasable attaching devices, as is known to those skilled in the art.

The fixture straps 18 and 28 (with integral links 40 and 42) are made by machining or punching or the like from strap stock as desired. Fixture strap material includes tool steel, stainless steel, and the like. These fixture straps are welded or brazed at their intersects to form the bottom 16 or top 26 member of the grid welding fixture 10. As can be appreciated by those skilled in the art, instead of having a long pin 46 engaging aligned holes 44 in all the links 40 and 42 on a side of the cage-like square array, a short pin or button could engage aligned holes in each outermost pair of upward extending 40 and downward extending 42 links with the other intervening links being devoid of holes. Also, the grid welding fixture 10 can be sized to accommodate any grid configuration such as a 4×4 grid (4 rows and 4 columns of nuclear fuel rods), a 16×16 grid, etc. As can be seen from the Figures, the links 40 (and 42) are offset from their fixture strap 18 (and 28) such that opposing upward extending 40 and downward extending 42 links are touching (or nearly touching) when the top fixture member 26 is secured to the bottom fixture member 16.

In operation, the bottom edges 24 of some grid straps 12 are alignably engaged in the top notches 20 of the bottom fixture straps 18 of the bottom member 16 to form a first parallel set. Then more grid straps 12 are perpendicularly interleaved with the grid straps of the first parallel set and guided to have their bottom edges 24 alignably engaged in the remaining top notches 20 of the bottom fixture straps 18. The top member 26 is then lowered, and the grid strap's top edges 34 are guided into the bottom notches 30 of the top fixture straps 28. For each side of the square array of links 40 and 42, a separate pin 46 is slidably engaged in each set of aligned holes 44. The grid straps 12 are now held in the grid welding fixture 10 to be welded into a grid 14. After welding, the grid welding fixture 10 is disassembled and the welded grid 14 obtained by removal of the pins 46 and then by separation of the bottom 16 and top 26 members.

It will be apparent that many modifications and variations are possible in light of the above teachings. It, therefore, is to be understood that within the scope of the appended claims, the invention may be practiced other than as specifically described.

I claim:

1. A nuclear reactor fuel assembly grid welding fixture, for positioning grid straps in an egg-crate array during their welding together into a nuclear reactor fuel assembly grid, comprising:
    (a) a rigid bottom member having a first plurality of interleaved bottom fixture straps, fixedly arranged in a first egg-crate configuration, with top notches on their top edges, said top notches disposed to engage the bottom edges of said grid straps when said grid straps are in alignment for welding togther into said grid;
    (b) a rigid top member having a second plurality of interleaved top fixture straps, fixedly arranged in a second egg-crate configuration, with bottom notches on their bottom edges, said bottom notches disposed to engage the top edges of said grid straps when said grid straps are in alignment for welding together into said grid; and
    (c) means for releasably securing said bottom member and said top member rigidly together when said grid straps are engaged in said top and bottom notches.

2. The grid welding fixture of claim 1, wherein said top notches are disposed such that a line segment joining any two adjacent said top notches on one said bottom fixture strap is generally perpendicularly bisected by an associated interleaved other said bottom fixture strap.

3. The grid welding fixture of claim 2, wherein said bottom notches are disposed such that a line segment joining any two adjacent said bottom notches on one said top fixture strap is generally perpendicularly bisected by an associated interleaved other said top fixture strap.

4. The grid welding fixture of claim 1, wherein said top notches have at least one side with a lead-in chamfered upper portion, and said bottom notches have at least one side with a lead-in chamfered lower portion.

5. The grid welding fixture of claim 1, wherein the outermost said top notches on each said bottom fixture strap are deeper and wider than the other said top notches on said each bottom fixture strap, and the outermost said bottom notches on each said top fixture strap are deeper and wider than the other said bottom notches on said top fixture strap.

6. The grid welding fixture of claim 1, wherein said securing means includes:
    (a) said bottom member also having a first multiplicity of generally vertically upward extending links each integral at its lower terminus with one end of a corresponding said bottom fixture strap;
    (b) said top member also having a second multiplicity of generally vertically downward extending links each integral at its upper terminus with one end of a corresponding said top fixture strap; and
    (c) means for releasably connecting the upper terminus of each said upward extending link to said top member and the lower terminus of each said downward extending link to said bottom member when said grid straps are engaged in said top and bottom notches.

7. The grid welding fixture of claim 6, wherein said upward extending links define one side of the outermost said top notches of said bottom fixture straps, and said downward extending links define one side of the outermost said bottom notches of said top fixture straps.

8. The grid welding fixture of claim 6, wherein said connecting means include said upward extending links and said downward extending links being disposed, when said grid straps are engaged in said top and bottom notches, such that together they define the sides of a cagelike square array surrounding said grid straps, with said upward extending and downward extending links associated with each side of said square array having a set of aligned holes, and said connecting means also including a pin slidably engageable with said set of aligned holes for each side of said square array.

* * * * *